Figure 3:
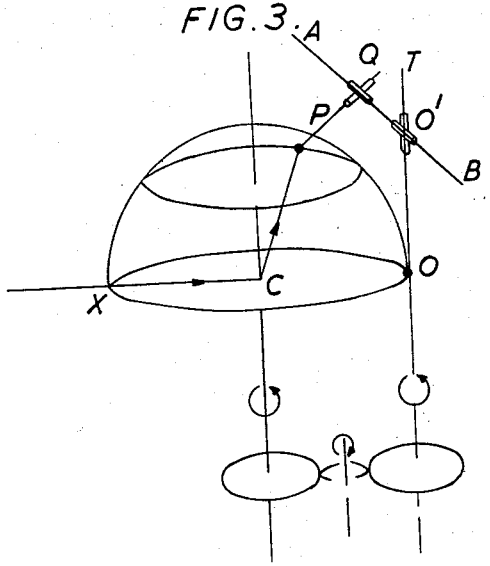

March 15, 1960     U. W. ARNDT ET AL     2,928,945
DIFFRACTOMETERS
Filed Oct. 3, 1958     3 Sheets—Sheet 1
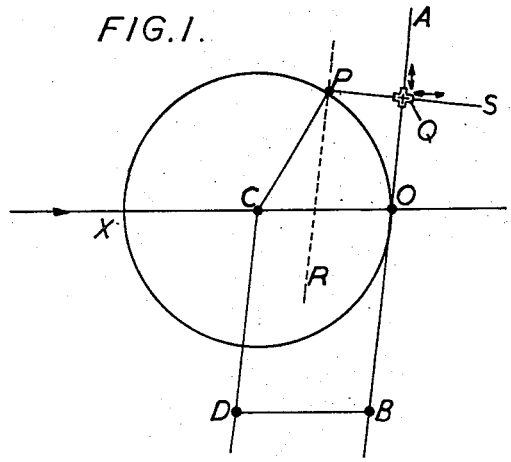
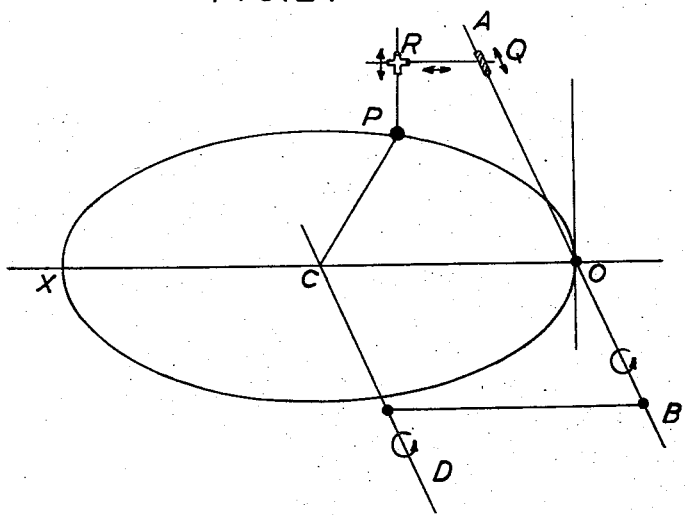
ULRICH WOLFGANG ARNDT, THOMAS
HAMILTON FAULKNER and DAVID CHILTON
PHILLIPS
*Inventors*
By *Larson and Taylor*
*Attorney*

ULRICH WOLFGANG ARNDT, THOMAS
HAMILTON FAULKNER and DAVID
CHILTON PHILLIPS Inventors

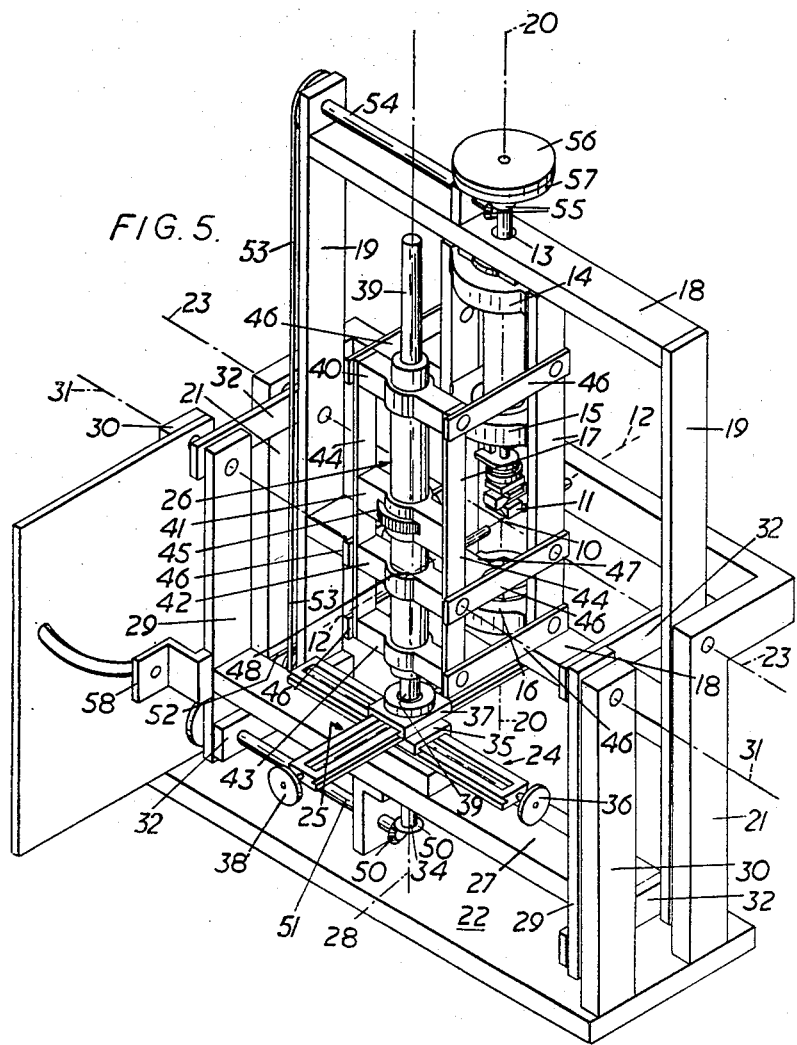

United States Patent Office 2,928,945
Patented Mar. 15, 1960

2,928,945

DIFFRACTOMETERS

Ulrich Wolfgang Arndt, London, Thomas Hamilton Faulkner, North Cheam, and David Chilton Phillips, London, England, assignors to National Research Development Corporation, a corporation of Great Britain and Northern Ireland Application October 3, 1958, Serial No. 765,136

Claims priority, application Great Britain October 4, 1957

11 Claims. (Cl. 250—53)

This invention relates to diffractometers such as are used for surveying the X-ray, neutron or electron diffraction spectra of a crystal or the diffraction pattern of a non-periodic structure. The most usual application of the invention will be in the field of X-ray diffraction and the invention will be described with particular reference to this application.

It is known that the diffraction pattern produced when monochromatic X-rays are diffracted by a single crystal may be represented by a three-dimensional array of points defined in position by a lattice, the so-called reciprocal lattice, and weighted according to the diffracted intensity. Each spectrum or reflection is thus characterised by three parameters or indices which represent the components of the vector from the origin of the reciprocal lattice to the point representing that reflection. It can be shown that the geometrical conditions for a reflection to occur are satisfied whenever the crystal, and hence its reciprocal lattice, is rotated in the incident X-ray beam in such a way as to make the corresponding reciprocal lattice point lie on the surface of an imaginary sphere, the "sphere of reflection."

Many "diffractometers" or "spectrometers," that is instruments for measuring the intensities of the reflection by means of radiation detecting devices such as ionisation chambers or Geiger-Muller, proportional or scintillation counters have been described. While these instruments differ in the particular geometrical arrangement adopted, they can be divided into two types: those in which all possible combinations of counter and crystal settings are produced in turn and those in which the rotations of the crystal and counter for a given reflection are calculated and the angular settings are made on suitable scales graduated in degrees or other angular intervals. Since the calculations involve equations of transformation in which the reciprocal lattice co-ordinates are related to the instrumental angles by trigonometrical ratios, no systematic survey reflection by reflection is possible without a separate calculation for each reflection. Such a system is not readily adapted for any kind of automatic survey since three separate adjustments are needed in changing from one general reflection setting to another.

According to the present invention an analogue computor comprising a mechanical model of the reciprocal lattice or, in the simplest case a central plane of the reciprocal lattice, is incorporated in a diffractometer. The improved apparatus thus comprises a system of three translational slides (or two slides if only a central plane of the lattice is to be investigated) which provide linear translations in non-co-planar directions and the system of slides is pivoted and constrained in such a manner that when a translation is effected on any one slide a rotation of the system takes place corresponding to the rotation of the reciprocal lattice which is required to satisfy the conditions for reflection, the detecting device being at the same time properly positioned to receive the reflected beam, while the specimen holder is coupled to the slide system in such manner that the specimen undergoes identical rotations. The system of slides is accordingly a mechanical analogue of the reciprocal lattice and its rotation may be transferred to the specimen by parallel linkages, by gearing, or by an electro-mechanical servomechanism comprising "selsyns" or equivalent devices. The detecting device may be attached to the slide system or both it and the specimen may be arranged at a distance from the slide system and the necessary movements transmitted in any convenient manner.

The apparatus of this invention permits the automatic surveying of the reciprocal lattice along any reciprocal lattice line set parallel to any of the slides, for example along lines parallel to the edges of the reciprocal-lattice unit-cell. Since the distance to be covered in going from one reciprocal lattice point to the next one along any reciprocal-lattice line is constant, the same is true of the movement along the corresponding slide. In going along any one reciprocal-lattice line only one slide need be adjusted and this adjustment automatically ensures that the specimen and detector take up their appropriate positions.

Figure 4:
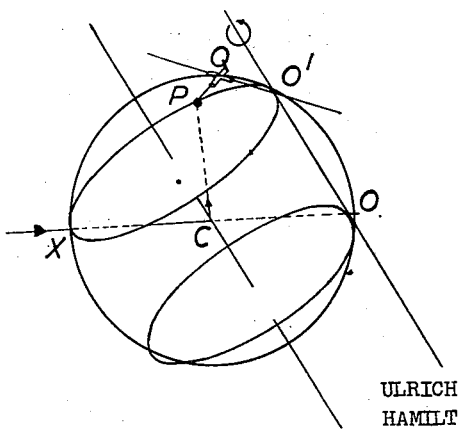

In order that the invention may be clearly understood it will now be described with reference to the accompanying drawings, in which:

Figure 1 is a diagrammatic illustration showing how the principle of the invention is applied to a two-dimensional arrangement, Figures 2 to 4 illustrate the application of the invention to three-dimensional arrangements, and Figure 5 is an isometric view of one form of apparatus embodying the invention.

Referring now to Figure 1, C indicates the position of the specimen, XCO the direction of the incident beam of X-rays, and O is the origin of the reciprocal lattice. A slide AOB is pivoted at O and the saddle Q can be moved along it by some suitable device such as a micrometer screw. Similarly PS represents a second slide at right angles to OA and on which the saddle Q also moves. The point P of this second slide is constrained to move along the reflecting circle XPO (which is a section of the sphere of reflection) by means of a link of fixed length CP, pivoted at C and at P. As P moves along the circle the slide BOA rotates about O and this rotation is transferred to the crystal at C either by linkages CD—OB and DB—CO as shown or by means of gear trains. According to the standard reciprocal lattice construction CP represents the direction of the reflection corresponding to the reciprocal lattice point P. The detecting device is therefore mounted on the arm CP. Then, if the distance PQ is kept constant moving saddle Q along OA will result in the scanning of all the reflections corresponding to reciprocal lattice points in the line RP which is parallel to OA and distance PQ from it.

The method can be extended to three dimensions in a number of different ways. If it is desired to restrict the movement of the detecting device to a single plane containing the incident beam, the two-dimensional version of Figure 1 may be modified to permit scanning of reciprocal space in three dimensions subject to this limitation as shown diagrammatically in Figure 2. A third slide PR, not coplanar with OA and QR, is provided and the whole slide system, the reciprocal lattice analogue, is allowed to rotate about OA constrained by the arm CP which is maintained in the horizontal plane. The additional rotation is transferred to the specimen which is mounted for movement on a vertical circle or large arc, by a further system of parallel linkages or gears.

An alternative version is illustrated in Figure 3. The line CP on which the detecting device is mounted is now allowed to move out of the horizontal plane. As in the arrangement of Figure 2, an additional slide OT is provided and rotation of the whole slide system is transferred to the specimen by the gearing indicated. This arrangement has the advantage that only a simple specimen mounting is required with only one axis of rotation always parallel to and the same distance from the rotation axis of the reciprocal lattice analogue. On the other hand it suffers from the disadvantage that a large region of reciprocal space cannot be investigated since points in it cannot be brought into the sphere of reflection. This difficulty can be removed, however, by allowing the crystal and reciprocal-lattice-analogue axes of rotation to tilt about an axis perpendicular to them and to the incident beam as illustrated in Figure 4.

Further arrangements are possible but for general purposes this equi-inclination method of Figure 4 in which the crystal axis of rotation is equally inclined to the incident and to the diffracted beam is preferred since in this arrangement the crystal mounting is simple and its rotations are kept to a minimum for complete coverage of the volume of reciprocal space near the origin. The volume of reciprocal space which can be surveyed depends on the traverses in the reciprocal lattice analogue and the orientations of the detecting device which are mechanically possible and on the wavelength of the radiation used. Following the principles discussed above, it is possible to construct an instrument for the linear surveying of all reciprocal space out to a radius corresponding to scattering angles of 150° or more. An instrument with a lower limit of scattering angle is, however, easier to design and is, moreover, for most purposes just as useful. Protein crystals, for example, do not give reflections of copper $K\alpha$ radiation at higher scattering angles than 60° and the range of reflections available from other crystals can be covered within such an upper limit by the use of a suitable radiation with short wavelength.

One form of apparatus embodying the invention and using the method of Figure 4 is shown in isometric projection in Figure 5.

In this arrangement a crystal or other specimen to be examined is mounted at 10 on a standard goniometer head 11 and is arranged in the path of an X-ray beam which is directed along a fixed axis 12 from a source, not shown. The goniometer head 11 is mounted on the lower end of a shaft 13 which is carried in bearing members 14 and 15. These members together with a lower member 16 are joined together by side members 17 to form a rigid assembly which is pivotally mounted between the cross members 18 of a main frame, which also includes the upright members 19, for rotation about an axis 20 which coincides with the axis of shaft 13 and intersects the axis 12 at the point 10. The upright members 19 of the frame 18, 19 are pivotally secured on uprights 21 which extend from the base 22 so that the frame can be rotated about an axis 23 which also passes through the point 10. The reciprocal lattice analogue comprising the system of slides 24, 25 and 26 is pivotally mounted on a horizontal bar 27 for rotation about an axis 28. The ends of this bar are secured with the upright members 29 of a second frame and these members 29 are likewise pivotally mounted on uprights 30 which extend from the base 22 so that this frame can be rotated about an axis 31 which intersects the axes 12 and 28 in the point 48. The upright members of the two frames are also connected by parallel links 32 so that the frames are held parallel at any angular position relative to the base.

The lower slide 24 of the slide system is pivotally mounted on the bar 27 and is fast with a shaft 34 which is carried in bearings therein. The slide 24 carries a saddle 35 which is slidable thereon under control of a screw and nut mechanism operated by the wheel 36 and this saddle is secured with the second slide 25 which in turn carries a saddle 37 similarly adjustable along its length by wheel 38. As shown, the two slides 24 and 25 are arranged at right angles to one another but this is not essential and means may be provided for adjusting the angle between them. The saddle 37 carries a bearing for the lower end of a shaft 39 that forms a part of the third slide 26. On this shaft 39 is slidably mounted an assembly comprising bearing members 40 to 43 which are rigidly secured between upright members 44. The assembly is adjusted on the shaft 39 by a screw and nut mechanism under control of the wheel 45, a threaded member fast with the wheel engaging a thread formed on a portion of the shaft 39. The assembly is also pivotally connected by means of parallel links 46 with the assembly 14–17. A counter or other radiation detecting device 47 is supported between the intermediate pair of links 46 and since the pivotal axis of these links on members 17 coincides with the axis 23, the counter will always be directed towards the specimen at point 10 irrespective of the movement of the apparatus.

It will be seen that the pivotal connections of the links 46 with the members 44 and with the members 17 ensure that the axis of the slide 26 is always held parallel with the axis of rotation 20 of the specimen and that the effective end of the counterarm corresponding to the point P in Figure 1 which is coincident with the point 48 in the central position of the instrument shown in Figure 5 is constrained by these links to move over a spherical surface centred on the point 10. The point 48 is shown at the centre of the reciprocal lattice and the distance between the points 10 and 48 represents the radius of the sphere of reflection.

As mentioned above, the whole slide system is pivotally mounted on the bar 27 and its rotation is transmitted by the shaft 34 through bevel gears 50, shaft 51, metal tapes 52 and 53, shaft 54 and bevel gears 55 to the shaft 13 on which the goniometer head 11 is mounted whereby any rotation of the slide system produces a corresponding rotation of the specimen.

To facilitate the setting up of the apparatus the shaft 13 is connected with its driving bevel gear 55 through a form of clutch whereby the goniometer head 11 and specimen may be rotated without transmitting such rotation through shaft 54 back to the slide system. To facilitate adjustment a disc 56 is provided on the shaft 13 which, when the clutch is disengaged, will be rotatable relative to disc 57 fast with bevel gear 55 and suitable scales may be provided on the peripheries of the two discs.

In operation of the apparatus, and assuming that the diffraction pattern of an orthorhombic crystal is to be surveyed, the crystal is set on the goniometer head 11 at the point 10 so that its $c$ axis is parallel to the instrument axis 20 and so that its $a$ axis is parallel to the reciprocal-lattice-analogue-slide 24. The crystal $b$ axis is then parallel to the slide 25, assuming that these two slides are arranged at right angles to one another.

The reflections $h00$ are located in turn by moving the effective centre of the counter, that is the point 48, along the slide 24, the motion being controlled by manual or motorised rotation of the wheel 36. Since the distance between points 10 and 48 is fixed, movement of point 48 along slide 24 constrains the reciprocal-lattice-analogue to rotate about the axis 28 and the rotation of shaft 34 is transferred to the crystal by means of the drive system described. Reflections $h10$ are found by setting the effective centre of the counter a distance $b^x$ from the centre of the reciprocal lattice along the slide 25 (controlled by the wheel 38) and then again moving it along the slide 24. Similarly the rows of reflections $h20$, $h30$ and so on and hence the whole reciprocal lattice level $hk0$ may be scanned systematically.

In order to scan the reciprocal lattice level $hk1$, the counter is first centred on the slides 24 and 25 and is then moved a distance $c^x$ along the slide 26 by means of the wheel 45. Again, because the distance between points 10 and 48 is fixed, this motion along the shaft 39 makes the crystal and reciprocal lattice axes (and hence the two frames) tilt through an angle $$\theta(001) = \sin^{-1}\left(\frac{c^*}{2}\right)$$

The instrument is balanced to facilitate this tilting. The angle of tilt may be fixed by means of a locking screw at 58 and the upper level $hk1$ is then surveyed in the same way as the zero level $hk0$. The remaining upper levels $hk2$, $hk3$ and so on, and hence the whole diffraction pattern, are surveyed in the same way.

To facilitate the adjustments, the wheels 36, 38 and 45 which control the movement of the slides may be provided with suitable scales or revolution counters (not shown) whereby the distance moved along each slide may be readily observed.

It will be appreciated that in the instrument described the survey of diffraction spectra from a crystal or of the diffraction pattern from a nonperiodic structure, is carried out by instrumental adjustments which are linear translations along reciprocal lattice axes. This eliminates the necessity of computing settings of the instrument and makes possible completely automatic data collections. Since for even a simple crystal with a small unit-cell hundreds of reflections must be measured, while for a complicated structure as that of a protein the number may run into tens of thousands, such automatic setting is of great importance.

It will be appreciated that many variations of the illustrated embodiment of the invention are possible, for example the reciprocal lattice analogue might be mounted separately and used to generate the rotations which could then be transmitted by a remote control system to a diffractometer provided with the appropriate axes of rotation.

Moreover, the instrument described may be simplified if the full range of facilities provided is not required. For example, if an instrument is required for the investigation only of a central section of the diffraction pattern, the slide 26 and the facility for tilting the slide system and specimen about axes 31 and 23 may both be omitted, thus giving an instrument equivalent to that illustrated diagrammatically in Figure 1. Similarly an instrument corresponding to that illustrated diagrammatically in Figure 3 would be obtained if the slide 26 of the instrument shown in Figure 5 is retained but the facility for tilting the slide system and specimen about axes 31 and 23 is omitted. In both these simplified instruments the transmission of the rotation of the slide system to the specimen axis can be made more direct.

We claim:

1. A diffractometer comprising a holder for rotatably supporting a specimen in a beam of radiation, a radiation detector, means for positioning said detector to receive radiation reflected from said specimen, and for moving it over a spherical surface centred on said specimen, said means including a system of at least two slides adapted to provide linear translations in different directions, said system being mounted for rotation about an axis parallel to the axis of rotation of said specimen and constrained by means of links such that a linear translation along any slide produces a corresponding rotation of said slide system, and means for coupling said specimen holder with said slide system such that rotation of said slide system produces a corresponding rotation of said specimen.

2. A diffractometer comprising a holder for supporting a specimen in a beam of radiation, means for rotating said holder, a radiation detector, means for supporting said detector to receive radiation reflected from said specimen and for moving it over a spherical surface centred on said specimen, said means comprising a slide system mounted for rotation about an axis parallel to the axis of rotation of said holder, said system including three slides providing linear translation each in a different direction, link means constraining the movement of said slide system relative to the axis of rotation of said holder, and means coupling said slide system with said holder such that rotation of said system produces a corresponding rotation of said holder.

3. A diffractometer comprising a holder for supporting a specimen in a beam of radiation, means for rotating said holder, a radiation detector, means for constraining said detector for movement at a constant distance from said specimen, means for supporting said detector comprising a system of at least two slides each providing a linear translation in a different direction, said slide system being mounted for rotation about an axis parallel to the axis of rotation of said holder, and means rotationally coupling said slide system and said holder.

4. A diffractometer comprising a holder for supporting a specimen in a beam of radiation, means for rotating said holder, a radiation detector, means for supporting said detector to receive radiation reflected from said specimen, said means including a system comprising two slides providing linear translations in different directions in a plane normal to the axis of rotation of said holder, and means for constraining said detector to move on an arcuate path at a constant distance from said specimen, means for mounting said slide system for rotation about an axis parallel to the axis of rotation of said holder, and means connecting said slide system with said holder for producing rotational movement of said holder in response to rotational movement of said slide system.

5. A diffractometer comprising a holder for rotatably supporting a specimen in a beam of radiation, a radiation detector movably mounted to receive radiation reflected from said specimen, means for constraining said detector to move over a spherical surface centred on said specimen, supporting means for said detector comprising a system of three slides for producing linear translations in non-coplanar directions, means for mounting said slide system for rotation about an axis parallel with the axis of rotation of said holder and means for transferring rotation of said slide system for producing rotation of said holder.

6. A diffractometer comprising a holder for supporting a specimen in a beam of radiation, means for rotating said holder about a first axis and for tilting said first axis about a second axis, said second axis intersecting said first axis and the axis of said beam, a radiation detector for receiving radiation reflected from said specimen, means constraining said detector to move over a spherical surface centred on said specimen, means for supporting said detector comprising a system of three slides providing linear translations in three non-coplanar directions, means for supporting said slide system for rotation about a third axis which extends parallel to said first axis and for tilting said slide system about a fourth axis which extends parallel to said second axis, and means for transferring rotational movement of said slide system to produce a rotational movement of said specimen holder.

7. A diffractometer comprising a holder for supporting a specimen in a beam of radiation, a rotatably mounted shaft supporting said holder, a first bearing assembly supporting said shaft, a first frame pivotally mounted for tilting movement about an axis intersecting the axis of said shaft and the axis of said beam, said first bearing assembly being pivotally mounted in said first frame for rotation about the axis of said shaft, a second frame pivotally mounted for tilting movement about an axis parallel to the axis of tilting movement of said first frame, a slide system pivotally mounted in said second frame for rotation about an axis parallel to the axis of said shaft, said slide system comprising a first and a second slide for producing linear translations in different directions in a common plane and a third slide for producing a linear translation in a direction normal to said plane and parallel to the axis of said shaft, said third slide comprising a rod, a second bearing assembly pivotally mounted on said rod, parallel links connecting said first and second bearing assemblies and driving means for transferring rotary movement of said slide system to said shaft.

8. For a diffractometer, a mechanical analogue of the reciprocal lattice, said mechanical analogue comprising a system of two interconnected slides each providing a linear translation in one of two coplanar directions, means for mounting said system for rotation about an axis normal to the planes of said slides and means for constraining a point on one of said slides to move over an arcuate path about a fixed centre whereby a translation effected on one slide produces a rotation of the slide system corresponding to that rotation of the reciprocal lattice which is required to satisfy the condition for reflection.

9. For a diffractometer a mechanical analogue of the reciprocal lattice, said mechanical analogue comprising a system of two interconnected slides each providing a linear translation in one of two coplanar directions, means for mounting said slide system for rotation about an axis normal to the plane containing said slides, and link means connecting one of said slides with a fixed centre whereby to constrain a point on said one slide to move over an arcuate path at a fixed distance from said centre.

10. For use with a diffractometer, a mechanical analogue of the reciprocal lattice, said mechanical analogue comprising a system of three interconnected slides providing linear translations in non-coplanar directions, means for pivotally mounting on said system for rotation about an axis coinciding with the axis of translation of a first slide of the system and normal to a plane containing the axes of translation of the second and third slides of the system, and means for constraining the movement of said first slide such that a point on it moves over a spherical surface about a fixed centre whereby a linear translation on any one of said three slides produces a rotation of the slide system which corresponds to that rotation of the reciprocal lattice which is required to satisfy the condition for reflection.

11. For use with a diffractometer, a mechanical analogue of the reciprocal lattice, said mechanical analogue comprising a system of three interconnected slides providing linear translations in non-coplanar directions, said system being mounted for rotation about an axis coinciding with the axis of translation of one slide of the system and for tilting movement about an axis normal to the axis of rotation, and link means connecting said one slide with a fixed centre whereby to constrain a point on said one slide to move over a spherical surface at a fixed distance from said centre.

References Cited in the file of this patent
UNITED STATES PATENTS

| | | |
|---|---|---|
| 2,332,391 | McLachlan | Oct. 19, 1943 |
| 2,540,821 | Harker | Feb. 6, 1951 |
| 2,648,011 | Good | Aug. 4, 1953 |
| 2,805,342 | Lang | Sept. 3, 1957 |

OTHER REFERENCES

Clark: "Applied X-rays," 4th edition, 1955, pages 368 to 371.